(12) United States Patent
Hirashita et al.

(10) Patent No.: US 8,936,130 B2
(45) Date of Patent: Jan. 20, 2015

(54) ELECTRIC FORKLIFT

(75) Inventors: Toshiyuki Hirashita, Hiratsuka (JP);
Takayuki Mashiko, Kaminokawa-machi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/577,774

(22) PCT Filed: Feb. 27, 2012

(86) PCT No.: PCT/JP2012/054712
§ 371 (c)(1),
(2), (4) Date: Aug. 14, 2013

(87) PCT Pub. No.: WO2012/132698
PCT Pub. Date: Oct. 4, 2012

(65) Prior Publication Data
US 2014/0014422 A1    Jan. 16, 2014

(30) Foreign Application Priority Data

Mar. 29, 2011    (JP) ................................ 2011-072903

(51) Int. Cl.
*B66F 9/075*    (2006.01)
*B60K 17/16*    (2006.01)
(Continued)

(52) U.S. Cl.
CPC ........... *B66F 9/07509* (2013.01); *B60K 17/165* (2013.01); *B60K 1/00* (2013.01);
(Continued)

(58) Field of Classification Search
CPC .............. B60K 17/043; B60K 7/0007; B60K 2007/0061; B60K 2007/0046; B60L 2220/46; B66F 9/07509; B66F 9/07518; B66F 9/075; B60F 9/07595; F16D 51/18

USPC ........... 180/58, 59, 60, 61, 62, 291, 297, 299, 180/300, 65.22, 65.6, 292
See application file for complete search history.

(56) References Cited

U.S. PATENT DOCUMENTS 666,554 A * 1/1901 Pettee ............................ 180/58
773,575 A * 11/1904 Krotz ............................ 180/60
(Continued)

FOREIGN PATENT DOCUMENTS

DE    29 06 708    9/1980
JP    60-105506    7/1985
(Continued)

OTHER PUBLICATIONS

International Search Report from PCT/JP2012/054712 dated Apr. 3, 2012.

*Primary Examiner* — Brodie Follman
(74) *Attorney, Agent, or Firm* — Edwards Wildman Palmer LLP; James E. Armstrong, IV; Carolina E. Save

(57) ABSTRACT

An electric forklift includes: a drive unit including a unit case including a gear housing supporting a motor with an output shaft in a right and left direction and housing a gear train; and shaft housings protruding in the right and left direction from the gear housing, each of which houses a drive shaft, and each of which supports a wheel, wherein the drive shafts rotate via the gear train; support members, base end portions of which are rotatably engaged with outer peripheral portions of the shaft housings, and tip end portions of which are connected to a body frame so that the shaft housings are supported by the body frame via the support members; and a link portion between the gear housing and the body frame for preventing relative rotation of the unit case and the body frame about shaft centers of the drive shafts.

5 Claims, 10 Drawing Sheets

(51) Int. Cl.
 *B60K 1/00* (2006.01)
 *B60B 35/16* (2006.01)
 *B60T 1/06* (2006.01)
 *B60B 27/00* (2006.01)

(52) U.S. Cl.
 CPC ...... *B60Y 2200/62* (2013.01); *B60K 2001/001* (2013.01); *B66F 9/07586* (2013.01); *B60B 35/16* (2013.01); *B60T 1/062* (2013.01); *B60B 27/0015* (2013.01); *B60Y 2200/83* (2013.01); *B66F 9/07572* (2013.01)
 USPC ........................... 180/291; 180/297; 180/300

(56) References Cited

U.S. PATENT DOCUMENTS

| | | | | |
|---|---|---|---|---|
| 810,674 | A * | 1/1906 | Rae | 180/59 |
| 810,881 | A * | 1/1906 | Pfouts | 180/253 |
| 896,208 | A * | 8/1908 | Hoffman | 180/63 |
| 1,549,534 | A * | 8/1925 | Graham | 180/57 |
| 2,927,703 | A * | 3/1960 | Smith et al. | 414/626 |
| 2,980,196 | A * | 4/1961 | Van Der Brugghen | 180/357 |
| 3,198,036 | A * | 8/1965 | Muller | 475/246 |
| 3,198,278 | A * | 8/1965 | Kaup | 180/291 |
| 3,207,249 | A * | 9/1965 | Singer et al. | 180/291 |
| 3,302,740 | A * | 2/1967 | Giacosa | 180/292 |
| 3,305,038 | A * | 2/1967 | Carter | 180/239 |
| 3,439,767 | A * | 4/1969 | Lynes et al. | 180/60 |
| 3,782,831 | A * | 1/1974 | Senften | 356/139.09 |
| 3,955,429 | A * | 5/1976 | Holden | 74/64 |
| 4,089,386 | A * | 5/1978 | Balchick | 180/294 |
| 4,100,986 | A * | 7/1978 | Shipitalo | 180/344 |
| 4,100,987 | A * | 7/1978 | Hildebrecht | 180/339 |
| 4,100,988 | A * | 7/1978 | Hildebrecht | 180/371 |
| 4,300,649 | A * | 11/1981 | Sakata | 180/55 |
| 4,402,380 | A * | 9/1983 | Strong | 180/292 |
| 4,405,027 | A * | 9/1983 | Enokimoto et al. | 180/56 |
| 4,421,187 | A * | 12/1983 | Shibata et al. | 180/375 |
| 4,441,575 | A * | 4/1984 | Suzuki | 180/248 |
| 4,449,603 | A * | 5/1984 | Langwieder et al. | 180/232 |
| 4,452,332 | A * | 6/1984 | Ping et al. | 180/312 |
| 4,967,510 | A * | 11/1990 | Torii et al. | 49/358 |
| 5,147,255 | A * | 9/1992 | Strehler et al. | 475/311 |
| 5,152,658 | A * | 10/1992 | Martin | 414/635 |
| 5,174,419 | A * | 12/1992 | Strehler et al. | 188/72.6 |
| 5,558,174 | A * | 9/1996 | Avitan et al. | 180/60 |
| 6,059,684 | A * | 5/2000 | Sasaki et al. | 475/206 |
| 6,098,740 | A * | 8/2000 | Abend et al. | 180/374 |
| 6,155,372 | A * | 12/2000 | Hirasaka | 180/297 |
| 6,488,297 | B2 * | 12/2002 | Murase | 280/124.1 |
| 6,540,042 | B2 * | 4/2003 | Hamaekers et al. | 180/300 |
| 6,864,607 | B2 * | 3/2005 | Hashimoto | 310/75 R |
| 6,948,576 | B2 * | 9/2005 | Angeles | 180/23 |
| 6,973,982 | B2 * | 12/2005 | Yoshikawa et al. | 429/430 |
| 6,997,280 | B2 * | 2/2006 | Minoura et al. | 180/291 |
| 7,055,406 | B1 | 6/2006 | Kuzuya et al. | |
| 7,104,374 | B2 * | 9/2006 | Takashi et al. | 192/35 |
| 7,171,809 | B2 * | 2/2007 | Sakikawa | 60/487 |
| 7,255,187 | B2 * | 8/2007 | Bell et al. | 180/65.25 |
| 7,326,140 | B2 * | 2/2008 | Kim et al. | 475/5 |
| 7,658,391 | B1 * | 2/2010 | Wurm | 280/80.1 |
| 7,931,103 | B2 * | 4/2011 | Morrow et al. | 180/65.6 |
| 7,975,790 | B2 * | 7/2011 | Kim et al. | 180/65.51 |
| 8,181,731 | B2 * | 5/2012 | Bessho et al. | 180/305 |
| 8,573,349 | B2 * | 11/2013 | Hirashita et al. | 180/305 |
| 2001/0013692 | A1 * | 8/2001 | Murase | 280/124.1 |
| 2003/0132039 | A1 * | 7/2003 | Gaffney et al. | 180/65.1 |
| 2004/0079568 | A1 * | 4/2004 | Bell et al. | 180/65.6 |
| 2005/0176546 | A1 * | 8/2005 | Fujita et al. | 475/150 |
| 2006/0037792 | A1 * | 2/2006 | Boss et al. | 180/65.6 |
| 2006/0118344 | A1 * | 6/2006 | Rosch | 180/65.1 |
| 2006/0225930 | A1 * | 10/2006 | Schulte | 180/65.4 |
| 2007/0295542 | A1 * | 12/2007 | Raue | 180/6.38 |
| 2008/0041654 | A1 * | 2/2008 | Raue | 180/346 |
| 2009/0071732 | A1 * | 3/2009 | Kim et al. | 180/24.07 |
| 2009/0100965 | A1 * | 4/2009 | Sanji et al. | 74/606 R |
| 2009/0272594 | A1 * | 11/2009 | Bussinger | 180/264 |
| 2011/0050374 | A1 * | 3/2011 | Dvorak | 335/219 |
| 2012/0026467 | A1 * | 2/2012 | Chapman | 352/243 |
| 2012/0052995 | A1 * | 3/2012 | Scarbo et al. | 474/86 |
| 2013/0146384 | A1 * | 6/2013 | Hirashita et al. | 180/307 |

FOREIGN PATENT DOCUMENTS

| | | |
|---|---|---|
| JP | 2-106976 | 8/1990 |
| JP | 2000-071794 | 3/2000 |
| JP | 2001-039174 | 2/2001 |
| JP | 2003-080903 | 3/2003 |
| JP | 2006-076436 | 3/2006 |

* cited by examiner

ELECTRIC FORKLIFT

FIELD

The present invention relates to an electric forklift which runs by drive of an electric motor, and in particular, to a structure for supporting a unit case, which includes a gear housing which houses a gear train and a shaft housing which houses a drive shaft, on a vehicle body frame.

BACKGROUND

As a structure for supporting a unit case, which includes a gear housing which houses a gear train and a shaft housing which houses a drive shaft, on a vehicle body frame, there has been, for example, a structure as illustrated in FIG. 10. In this conventional technology, support members B are rotatably fitted to shaft housings A, respectively, and thereafter, the support members B are connected to a vehicle body frame C so that a unit case D is supported by the vehicle body frame C. A pillar-shaped link portion F is provided on the support member B so as to protrude toward a gear housing E. A bolt H is screwed into the link portion F through a reaction force receiving portion G of the gear housing E so that the link portion F can prevent relative rotation between the unit case D and the vehicle body frame C about a shaft center of a drive shaft J (see, for example, Patent Literature 1).

CITATION LIST

Patent Literature

Patent Literature: Japanese Patent Application Laid-open No. 2000-71794

SUMMARY

Technical Problem

Meanwhile, when the link portion F provided on the support member B is fixed to the gear housing E, a distance from the shaft center of the drive shaft J to the link portion F is limited by the size of the support member B. Therefore, to withstand rotational reaction force due to rotation of the drive shaft J, the link portion F needs to have large strength, which leads to an increase in the weight of the unit case D.

Of course if the link portion F is provided at a longer distance from the shaft center of the drive shaft J, the strength of the link portion F can be reduced, so that the weight can be reduced. However, if the position of the link portion F is set to a position at a longer distance from the shaft center of the drive shaft J, the size of the support member B increases, so that the weight of a vehicle as a whole increases.

The present invention is made in view of the above description, and an object thereof is to provide an electric forklift capable of supporting a unit case on a vehicle body frame while suppressing an increase in the weight of a vehicle as a whole.

Solution to Problem

To overcome achieve the object, according to the present invention, an electric forklift comprises: a drive unit that includes a unit case, the unit case including a gear housing that supports an electric motor with an output shaft oriented in a right and left direction and that houses a gear train; and a pair of shaft housings which protrude in the right and left direction from the gear housing, respectively, each of the shaft housings rotatably housing a drive shaft, and each of the shaft housings rotatably supporting a wheel via a bearing, wherein the drive shafts rotate via the gear train when the electric motor is driven; a pair of support members, base end portions of which are rotatably engaged with outer peripheral portions of the shaft housings, respectively, and tip end portions of which are connected to a vehicle body frame so that the shaft housings in the right and left direction are supported by the vehicle body frame via the support members; and a link portion disposed between the gear housing and the vehicle body frame for preventing relative rotation of the unit case and the vehicle body frame about shaft centers of the drive shafts.

According to the present invention, the link portion protrudes from the gear housing toward the vehicle body frame at an outer peripheral position of a support position where at least one of the support members is supported on the vehicle body frame while the shaft centers of the drive shafts are assumed as a center, and the link portion is linked to the vehicle body frame through a projection end face.

According to the present invention, the electric forklift further comprises brake units, each of which is disposed between a hub linked to a corresponding one of the drive shafts and the outer peripheral portion of a corresponding one of the shaft housings, each of the brake units acting on the hub, and each of the brake units being supported on a base end portion of a corresponding one of the support members.

According to the present invention, the electric forklift further comprises a pair of preventing portions disposed on the support member, wherein the link portion is disposed between the preventing portions, and rotation of the support members with respect to the shaft housings is prevented by bringing the preventing portion into contact with the link portion.

According to the present invention, the preventing portions protrude from the tip end portion of the support member about the shaft centers of the drive shafts in an outer peripheral direction and preventing surfaces are provided on the preventing portions, respectively and the preventing portion comes into contact with the link portion via the preventing surface of the preventing portion.

Advantageous Effects of Invention

According to the present invention, a link portion for preventing relative rotation between a gear housing and a vehicle body frame is provided between the gear housing and the vehicle body frame. Therefore, the position of the link portion is not limited by the support member. Furthermore, it becomes possible to provide the link portion at a position with a longer distance from a shaft center of a drive shaft without increasing the size of the support member. Therefore, it is not necessary to make the link portion thick. As a result, it becomes possible to support a unit case on the vehicle body frame without increasing the weight of a vehicle as a whole.

DESCRIPTION OF EMBODIMENTS

Exemplary embodiments of an electric forklift according to the present invention will be explained in detail below with reference to the accompanying drawings.

Figure 1:
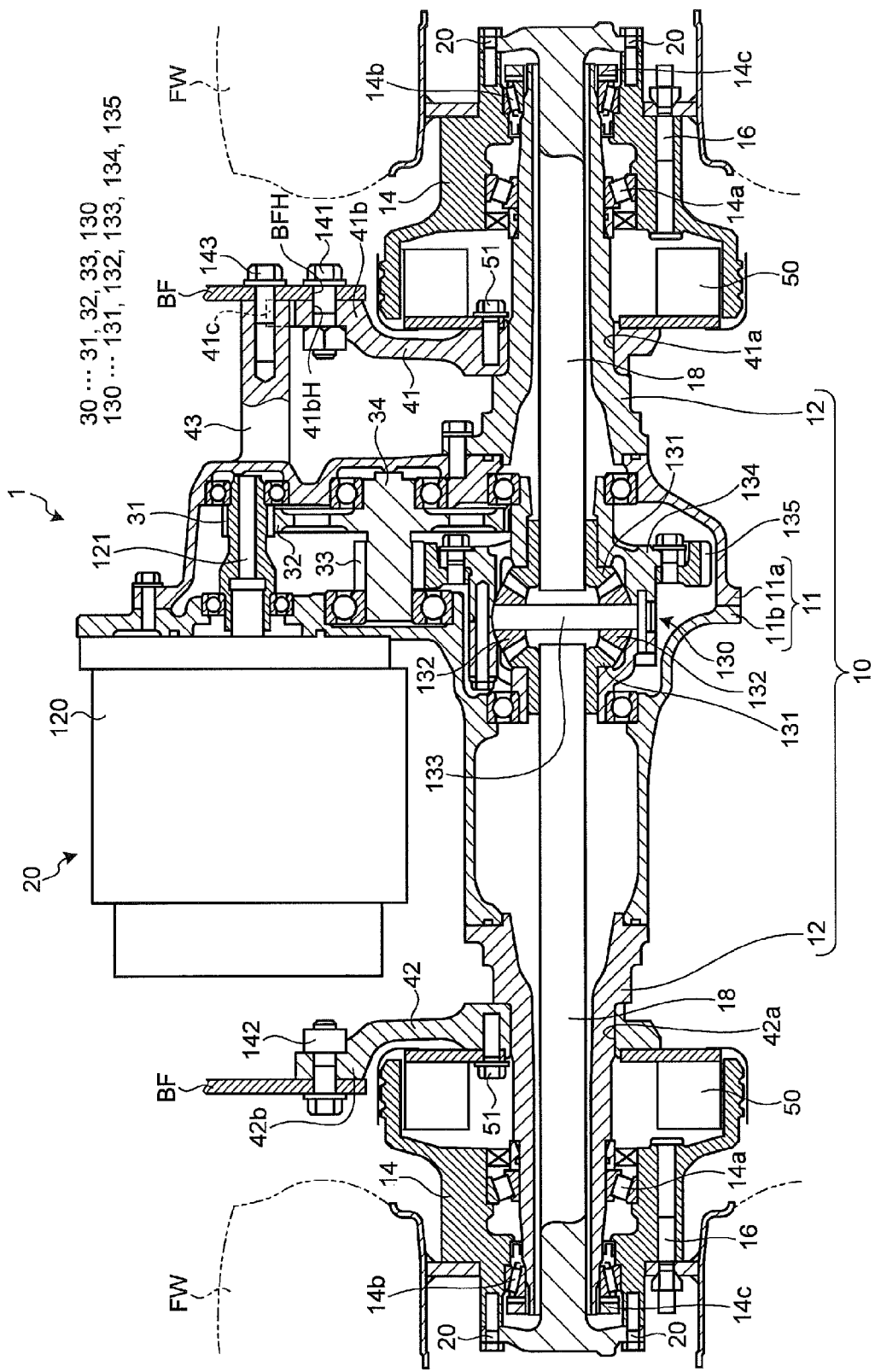
FIG. 1 is a cross-sectional view of a main part of an electric forklift according to the first embodiment of the present invention when viewed from above.
Figure 2:
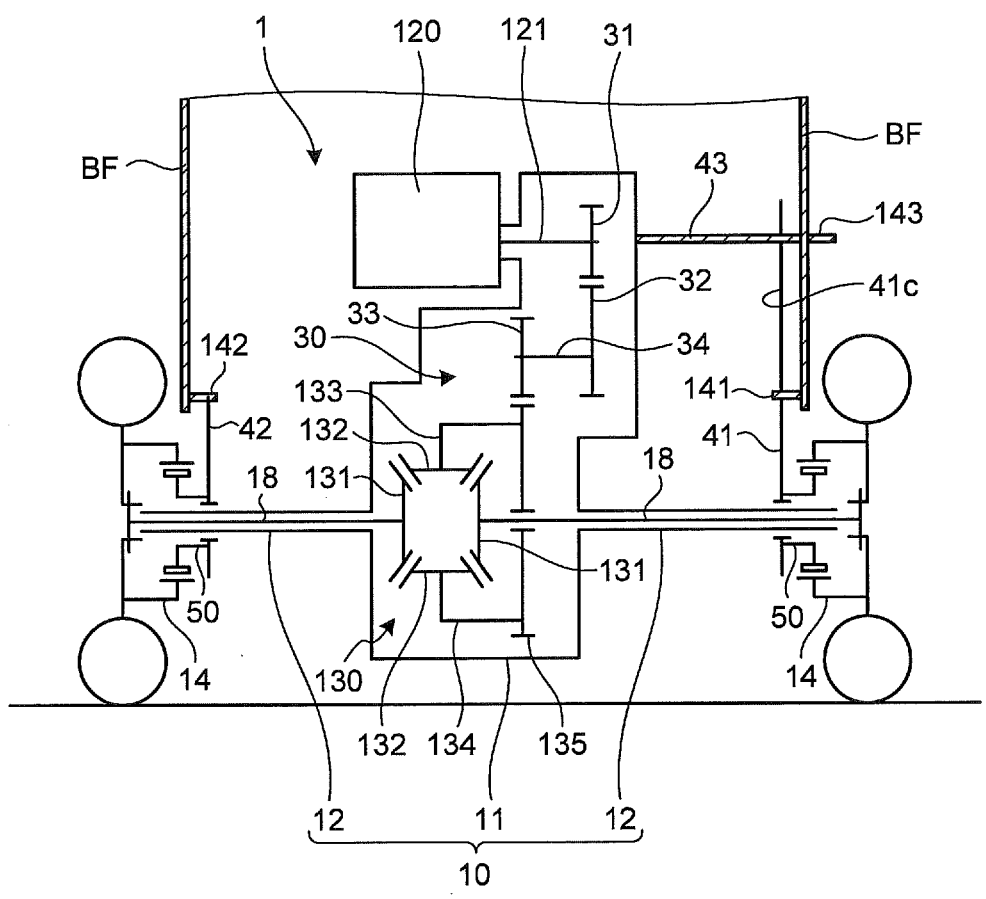
FIG. 2 is a skeleton diagram of the main part of the electric forklift illustrated in FIG. 1.
Figure 3:
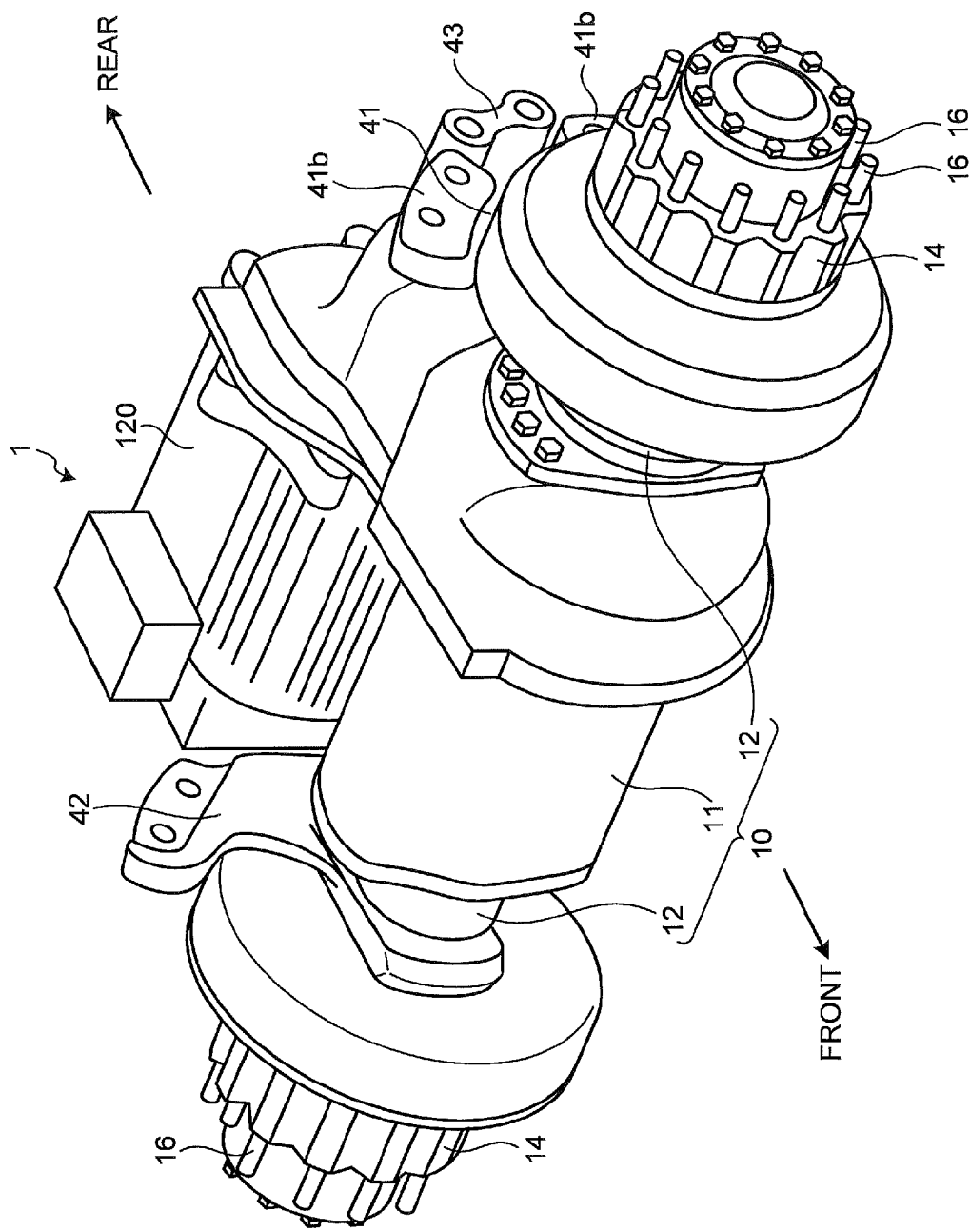
FIG. 3 is a main-part perspective view illustrating an exterior of the main part of the electric forklift illustrated in FIG. 1.
Figure 4:
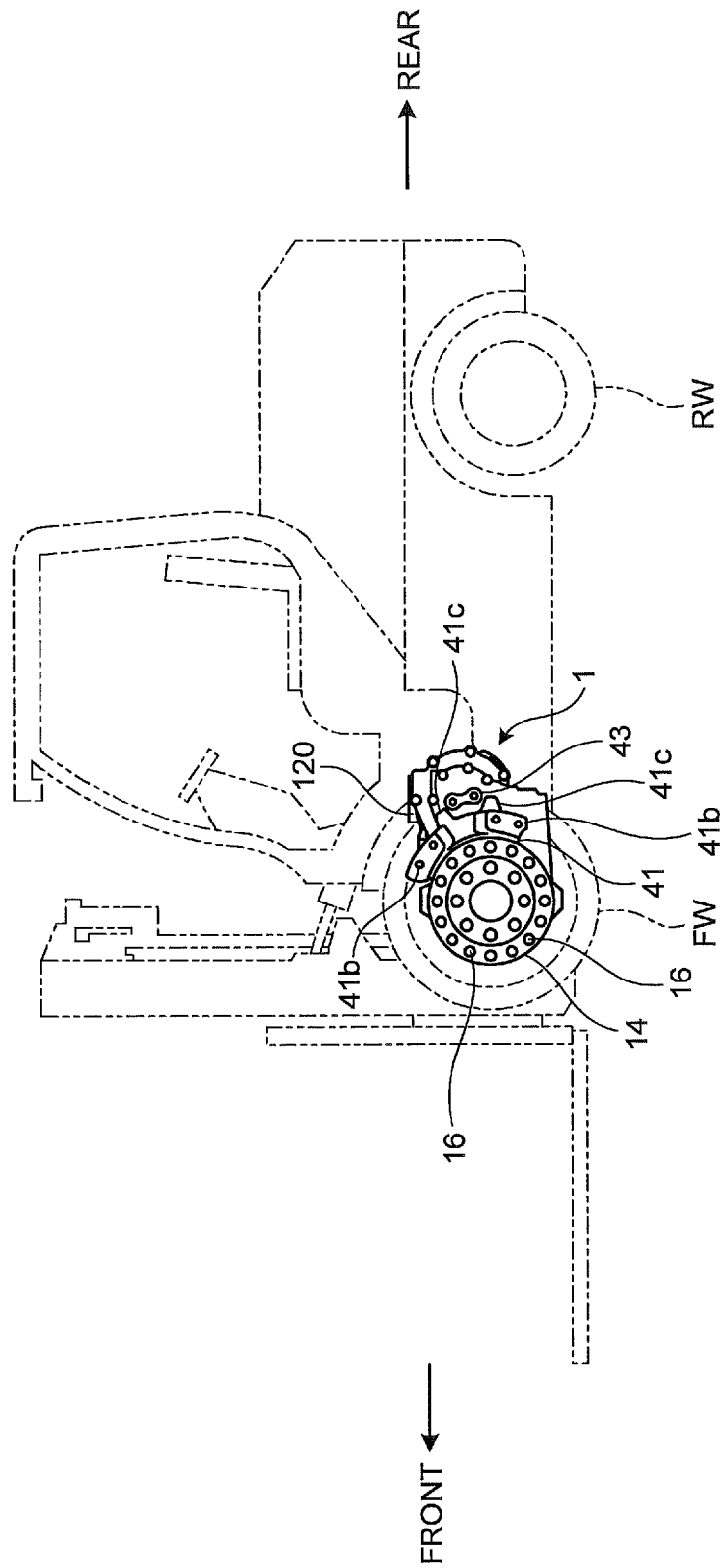
FIG. 4 is a side view of the electric forklift illustrated in FIG. 1.

FIG. 1 to FIG. 3 illustrate a main part of an electric forklift according to a first embodiment of the present invention. The electric forklift described below as an example runs with front wheels FW serving as drive wheels and rear wheels RW serving as steering wheels as illustrated in FIG. 4, and includes a unit case 10 of a drive unit 1 in a region between the front wheels FW in the front side of a vehicle body frame BF as illustrated in FIG. 1 and FIG. 2. The unit case 10 includes a gear housing 11 provided between the front wheels FW and includes a pair of shaft housings 12 protruding in a right and left direction from the gear housing 11. The gear housing 11 is formed of two right and left case parts 11a and 11b joined to each other, and has a hollow interior. Each of the shaft housings 12 has a tubular shape with both ends open, and the shaft housings 12 are attached to both ends of the gear housing 11, respectively such that the inside of the shaft housings 12 are communicated with the inside of the gear housing 11.

The unit case 10 supports an electric motor 120 in the gear housing 11 and rotatably supports the front wheels FW in the pair of the shaft housings 12 via hubs 14, respectively. The electric motor 120 is attached to a side surface of the gear housing 11 such that an output shaft 121 is oriented in the right and left direction and a tip portion of the output shaft 121 faces the inside of the gear housing 11. Each of the hubs 14 is supported in an outer peripheral portion of a corresponding one of the shaft housings 12 via hub bearings 14a and 14b, and is rotatable with respect to the shaft housing 12 about the shaft center of the shaft housing 12. The front wheels FW are detachably attached to the respective hubs 14 via hub bolts 16.

The shaft housings 12 of the unit case 10 house drive shafts 18, respectively. The gear housing 11 houses a gear train 30. The drive shafts 18 are shaft-shaped members with circular cross sections and are rotatably disposed inside the respective shaft housings 12 such that the shaft centers of the drive shafts 18 coincide with each other. Base end portions of the drive shafts 18 are disposed so as to face the inside of the gear housing 11. Driven gears 131 are provided on the base end portions of the drive shafts 18, respectively. The driven gears 131 form side gears of a differential gear 130 to be described below and are fixed to the respective drive shafts 18. Tip portions of the drive shafts 18 have disk shapes such that the diameters of portions protruding outward from the shaft housings 12 become large, and are fixed to end faces of the hubs 14 with shaft attachment bolts 20.

The gear train 30 transmits rotation of the output shaft 121 due to drive of the electric motor 120 to the drive shafts 18 on the right and left sides. In the first embodiment, the gear train 30 includes a drive gear 31, the differential gear 130, and two idle gears 32 and 33. The drive gear 31 is a spur gear fixed to the output shaft 121 of the electric motor 120. The differential gear 130 includes, similarly to a conventional one, a pair of side gears, pinion gears 132 respectively engaged with the side gears, a gear frame 134 for supporting shafts 133 of the pinion gears 132, and a ring gear 135 attached to the gear frame 134. As described above, the driven gears 131 provided on the base end portions of the drive shafts 18 serve as the side gears. The two idle gears 32 and 33 are spur gears provided on a same idle shaft 34 and have different outer diameters. The idle shaft 34 is rotatably supported in the gear housing 11 so as to be parallel to the output shaft 121 of the electric motor 120 such that the idle gear 32 having a greater diameter is engaged with the drive gear 31 and the idle gear 33 having a smaller diameter is engaged with the ring gear 135 of the differential gear 130.

In the drive unit 1, when the electric motor 120 is driven, rotation of the output shaft 121 is transmitted to the drive shafts 18 via the drive gear 31, the two idle gears 32 and 33, and the differential gear 130, so that the drive shafts 18 rotate about the respective shaft centers of the drive shafts 18 to thereby cause the front wheels FW to rotate via the hubs 14.

The unit case 10 of the drive unit 1 is supported on a vehicle body frame BF via support members 41 and 42 provided on the respective shaft housings 12. One side surface of the gear housing 11 and the vehicle body frame BF are linked by a link portion 43 which is linked to the vehicle body frame through a projection end face 44.

The support members 41 and 42 are, as illustrated in FIG. 1, high rigid members and include engaging holes 41a and 42a on base end portions thereof and joint connection portions 41b and 42b for connection with the vehicle body frame BF on tip end portions thereof, respectively. The support members 41 and 42 are disposed at the outer peripheral portions of the shaft housings 12 so as to rotate about the shaft centers of the shaft housings 12 by engaging the engaging holes 41a and 42a with the shaft housings 12, respectively. The tip end portions of the support members 41 and 42 are, as illustrated in FIG. 1, fixed on the vehicle body frame BF by frame attachment bolts 141 and 142 through the joint connection portions 41b and 42b, respectively. Although not illustrated in the drawings, in the shaft housings 12 on the right and left sides, the outer diameters of the portions engaged with the engaging holes 41a and 42a of the support members 41 and 42 are the same. Therefore, the shaft housings 12 on the both sides can be manufactured as common parts, and the support members 41 and 42 can be manufactured as common parts. As a result, it becomes possible to reduce the number of components, enabling to reduce manufacturing costs.

A brake unit 50 is provided between each of the base end portions of the support members 41 and 42 and a corresponding one of the hubs 14. The brake units 50 press brake linings (not illustrated) against the hubs 14 to thereby brake the rotation of the hubs 14 with respect to the shaft housings 12. The brake units 50 are supported on the base end portions of the support members 41 and 42 by brake attachment bolts 51.

Figure 5:
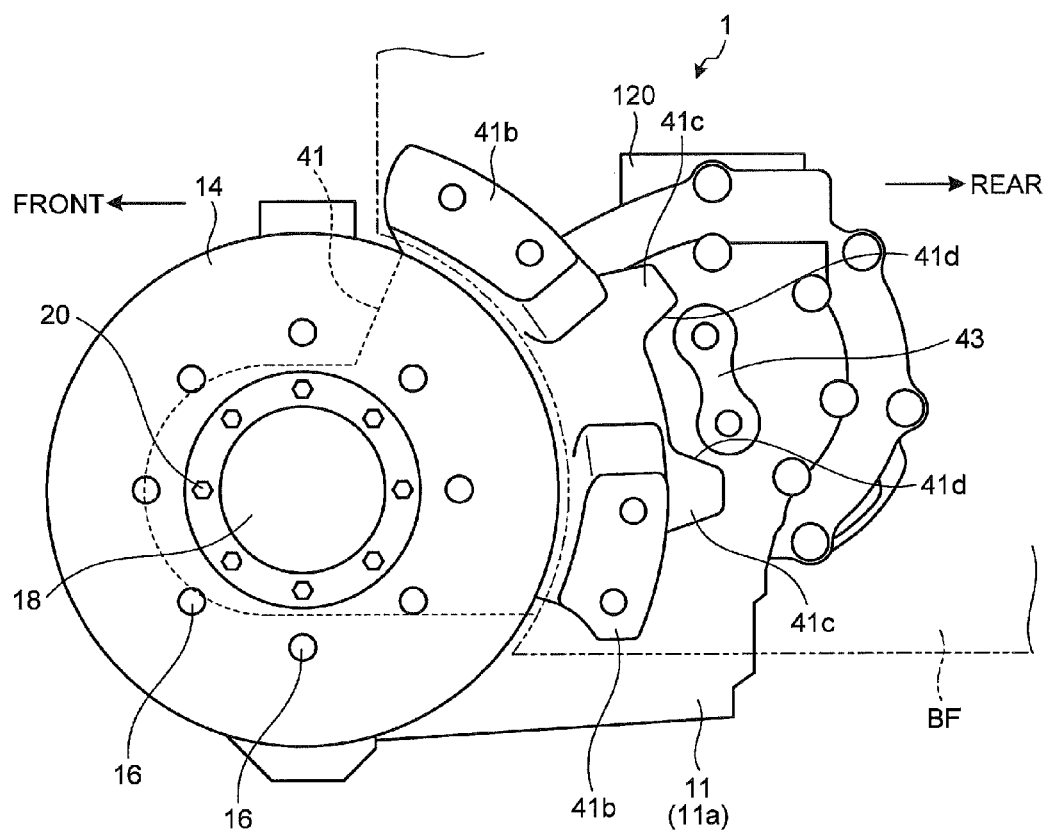
FIG. 5 is a side view illustrating an exterior of a drive unit of the electric forklift illustrated in FIG. 1.
Figure 7:
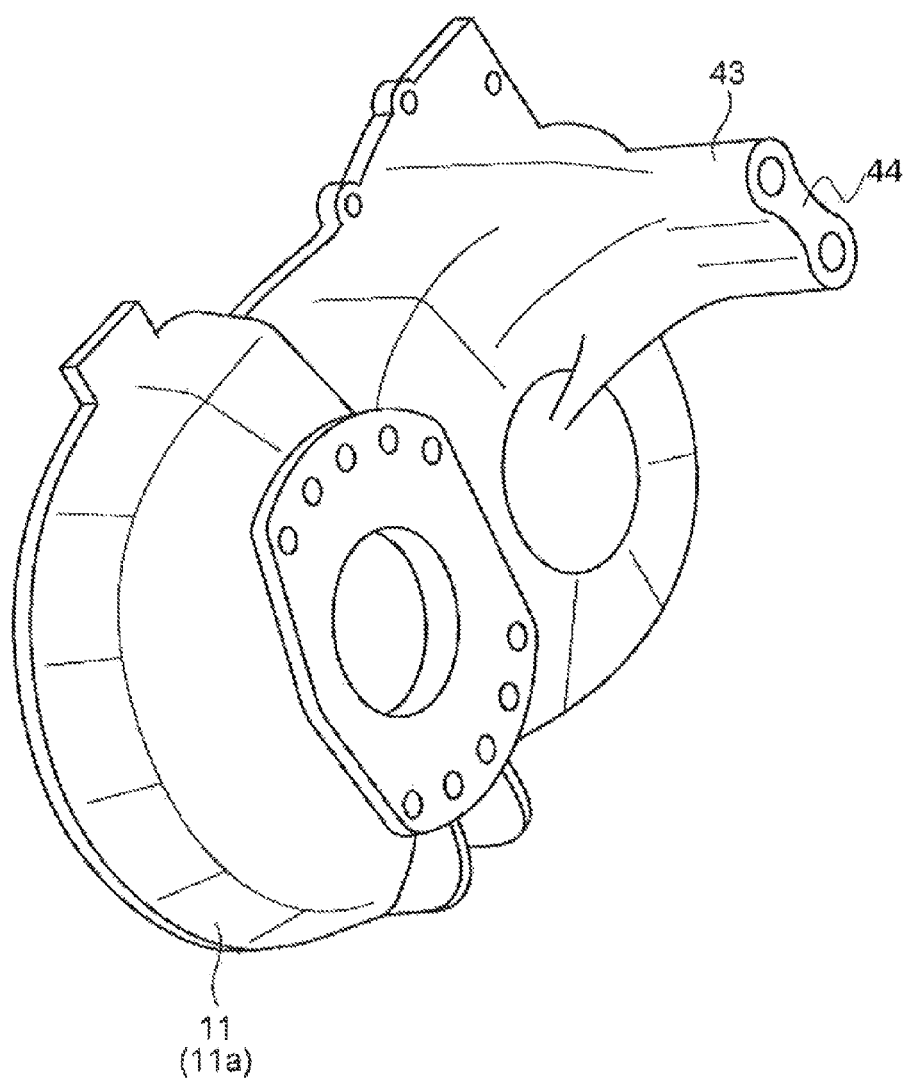
FIG. 7 is a perspective view of a gear housing of a unit case applied to the drive unit of the electric forklift illustrated in FIG. 1.

The link portion 43 is, as illustrated in FIG. 5 and FIG. 7, a pillar-shaped portion protruding from the gear housing 11, and is fixed to the vehicle body frame BF by a linking bolt 143 (FIG. 1) such that the tip end face of the link portion 43 is in contact with the vehicle body frame BF. As can be seen from FIG. 1 and FIG. 5, the position where the link portion 43 is disposed is located on the outer peripheral side of the tip end face of the support member 41 while the shaft centers of the drive shafts 18 are assumed as a center. The position where the linking bolt 143 is screwed into the link portion 43 is set on the outer peripheral side of a position where the frame attachment bolt 141 is screwed in the joint connection portion 41b, similarly to the above.

Figure 6:
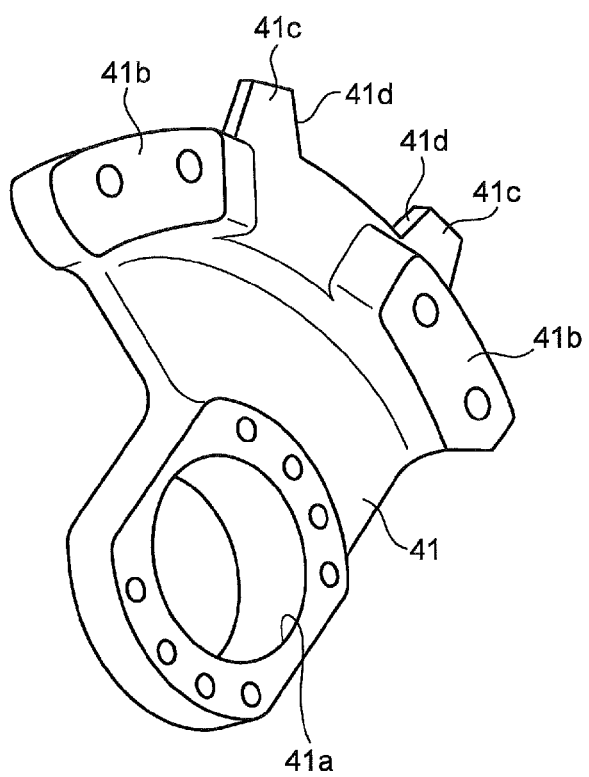
FIG. 6 is a perspective view of a support member applied to the drive unit of the electric forklift illustrated in FIG. 1.

As illustrated in FIG. 5 and FIG. 6, a pair of preventing portions 41c are provided on a tip end portion of the support member 41 being one of the support members 41. The preventing portions 41c are protrusions radially protruding from the tip end portion of the support member 41 about a shaft center of the drive shaft in an outer peripheral direction and are disposed such that the link portion 43 is located between the preventing portions 41c. The preventing portions 41c can come into contact with the link portion 43 via respective preventing surfaces 41d that are inside surfaces of the preventing portions 41c. An interval between the preventing surfaces 41d is set to be greater than the link portion 43 such that one of the preventing surfaces 41d comes into contact with the link portion 43.

According to the electric forklift including the drive unit 1 configured as above, the link portion 43 is disposed at a position separate from the shaft centers of the drive shafts 18 in the gear housing 11, and the gear housing 11 is linked to the vehicle body frame BF via the link portion 43. Therefore, the link portion 43 can receive rotational reaction force that occurs when the front wheels FW are accelerated or decelerated due to drive of the electric motor 120. In this case, the position where the link portion 43 is provided is not limited by the support member 41, and may be set to an outer peripheral position of the support member 41 with respect to the shaft centers of the drive shafts 18. Consequently, it becomes possible to receive large rotational reaction force without ensuring a large rigidity of the link portion 43. As a result, it is possible to reduce the weight of the unit case 10.

Besides, external force applied from the ground via the front wheels FW is transmitted to the vehicle body frame BF via the hubs 14, the hub bearings 14a and 14b, the shaft housings 12, and the support members 41 and 42, so that it becomes possible to prevent the external force from being applied to the gear housing 11 of the unit case 10. Therefore, even when the gear housing 11 is made thinner, it becomes possible to prevent the gear housing 11 from being deformed due to the external force applied from the ground. As a result, it becomes possible to reduce the weight of the drive unit 1 while preventing various failures due to deformation of the gear housing 11. Specifically, it becomes possible to prevent the deformation even when the gear housing 11 is made thinner, so that the drive shafts 18 and the idle shaft 34 can rotate while being maintained parallel to each other. As a result, it becomes possible to prevent abnormal noise, defect, or abnormal abrasion due to abnormal contact of the gear.

Figure 8:
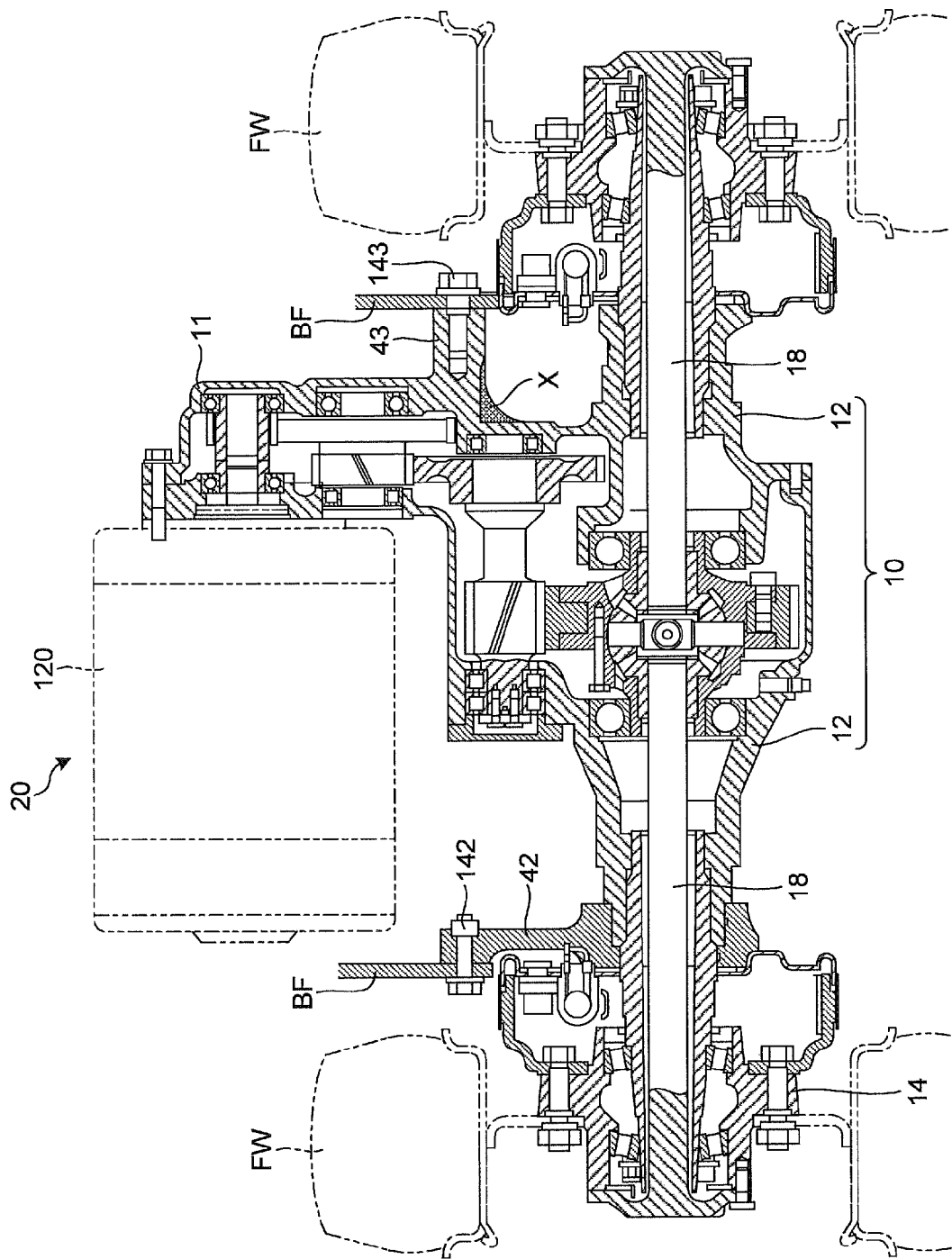
FIG. 8 is a cross-sectional view of a main part of an electric forklift according to a comparative example for comparison with the electric forklift of the first embodiment illustrated in FIG. 1.

FIG. 8 illustrates an electric forklift according to a comparative example for comparison with the electric forklift according to the first embodiment. The electric forklift according to the comparative example is different from that of the first embodiment only in that it does not include the support member 41 for supporting the shaft housing 12 on the vehicle body frame BF. In the comparative example, the same components as those of the first embodiment are denoted by the same reference symbols.

In the electric forklift of the comparative example configured as above, rotational reaction force that occurs when the front wheels FW are accelerated or decelerated due to drive of the electric motor 120 is received by only the link portion 43. Therefore, if a distance from the shaft centers of the drive shafts 18 to the link portion 43 is the same between the first embodiment and the comparative example, the link portion 43 of the comparative example needs to have greater strength than that of the first embodiment. For example, as illustrated by cross hatching in FIG. 8, it is necessary to ensure a large thickness at a portion where the link portion 43 is disposed in the gear housing 11. This is indicated by specific values as follows. To ensure the same strength of the unit case 10 in both of the first embodiment and the comparative example, the weight of 260 kilograms was needed in the comparative example but only 217 kilograms was satisfactory in the first embodiment (reduced by 17% by weight).

Furthermore, the preventing portions 41c are provided on the support member 41, which is one of the support members 41. The support member 41 is provided such that the preventing surface 41d on the inner side of each of the preventing portions 41c comes into contact with the link portion 43. Therefore, it becomes possible to simplify the assembly of the drive unit 1 as described below.

Specifically, while the shaft housings 12 are attached to both end portions of the gear housing 11 that is housing the gear train 30, the support member 41 and the brake unit 50 are disposed in the outer peripheral portion of the shaft housing located on the right side in FIG. 1 (hereinafter, when the shaft housing on the right side is distinguished from the shaft housing on the left side, it is referred to as "the right shaft housing 12"), and the brake unit 50 is supported on the base end portion of the support member 41. In this case, if the link portion 43 is disposed between the preventing portions 41c, the preventing surface 41d of the preventing portions 41c comes into contact with the link portion 43, so that rotation of the support member 41 with respect to the shaft housing 12 can be prevented. Therefore, even when the orientation of the gear housing 11 is changed in an arbitrary way in subsequent assembly operations, the joint connection portions 41b of the support member 41 can always be disposed on the both sides of the link portion 43.

Subsequently, the hub 14 is attached to the outer peripheral portion of the right shaft housing 12 via the hub bearings 14a and 14b, and a hub attachment nut 14c is screwed in an end portion of the shaft housing 12.

Subsequently, the drive shaft 18 is inserted into the right shaft housing 12, and the drive shaft 18 is fixed to the end face of the hub 14 by a plurality of the shaft attachment bolts 20.

Subsequently, the same operation is performed on the shaft housing located on the left side in FIG. 1 (hereinafter, when the shaft housing on the left side is distinguished from the shaft housing on the right side, it is referred to as "the left shaft housing 12"). Specifically, the hub 14 is attached to the outer peripheral portion of the left shaft housing 12 via the hub bearings 14a and 14b, and the hub attachment nut 14c is screwed in an end portion of the shaft housing 12. Furthermore, the drive shaft 18 is inserted into the left shaft housing 12, and the drive shaft 18 is fixed to the end face of the hub 14 via a plurality of the shaft attachment bolts 20.

Thereafter, the electric motor 120 is supported by the gear housing 11, and a special jig (not illustrated) is attached to the support member 42 disposed on the left shaft housing 12 to prevent relative rotation between the left shaft housing 12 and the support member 42. Subsequently, the link portion 43 and the vehicle body frame BF are linked by the linking bolt 143, and the joint connection portions 41b and 42b of the support members 41 and 42 and the vehicle body frame BF are linked by the frame attachment bolts 141 and 142, respectively, so that the drive unit 1 can be supported by the vehicle body frame BF.

As described above, because the relative rotation between the right shaft housing 12 and the support member 41 is prevented by the preventing surfaces 41d of the preventing portions 41c, bolt insertion holes BFH of the vehicle body frame BF and bolt insertion holes 41bH of the joint connection portions 41b are positioned so as to face each other. Therefore, when the frame attachment bolts 141 are screwed between the joint connection portions 41b of the support member 41 and the vehicle body frame BF, it is not necessary to perform positioning of the bolt insertion holes BFH of the vehicle body frame BF and the bolt insertion holes 41bH of the joint connection portions 41b, enabling to make the operation easier.

Figure 9:
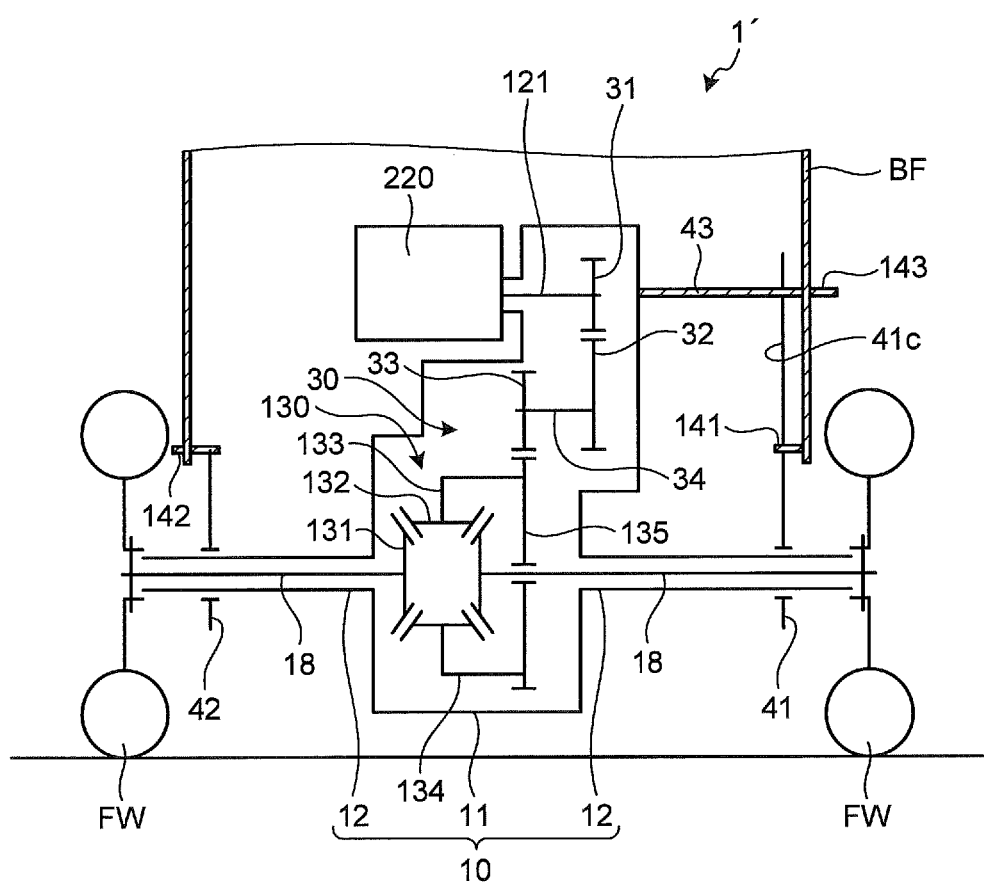
FIG. 9 is a skeleton diagram of a main part of an electric forklift according to a second embodiment of the present invention.
Figure 10:
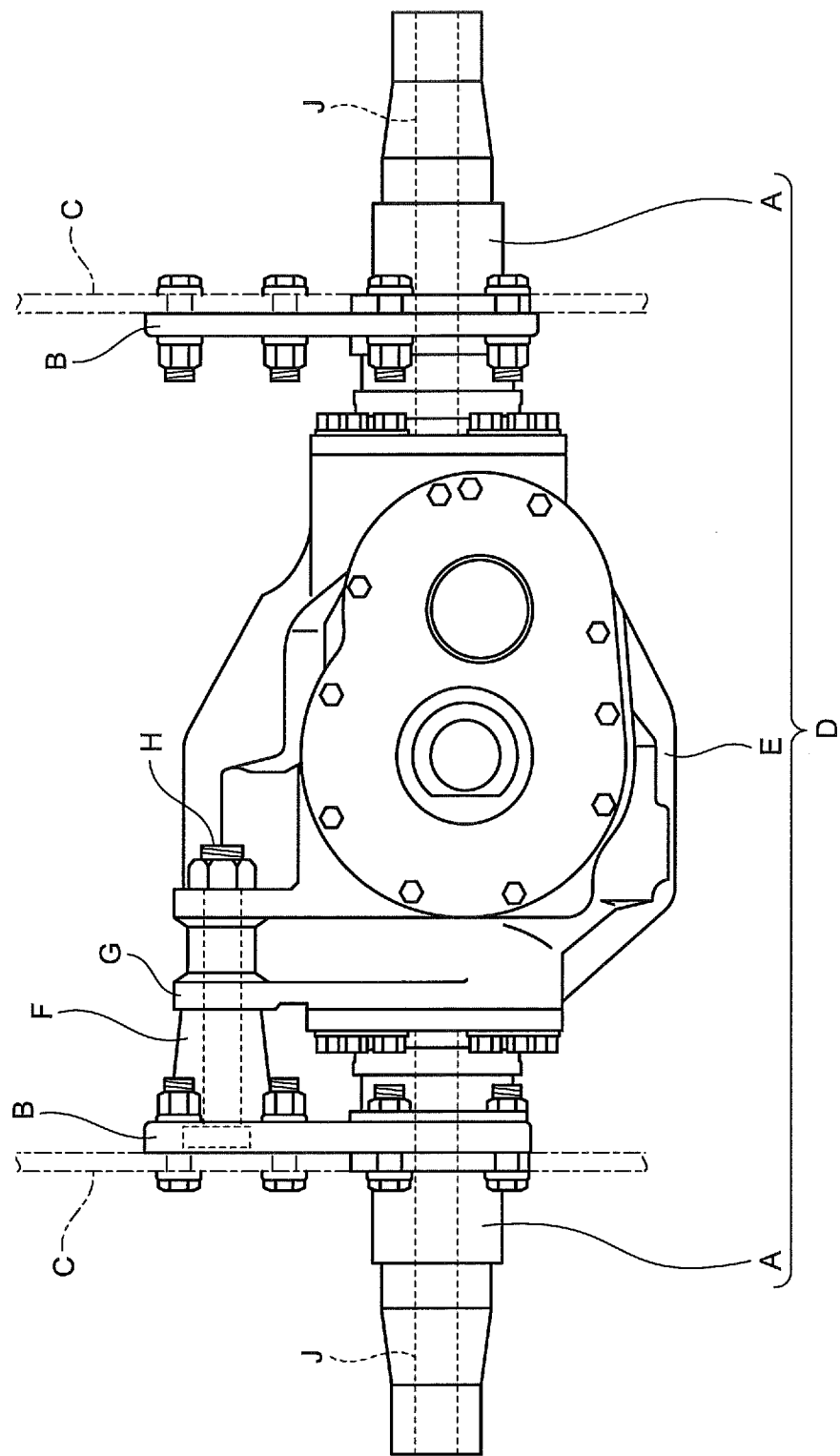
FIG. 10 is a diagram illustrating a conventional technology.

In the first embodiment described above, an example is illustrated in which the brake units 50 are disposed in the outer peripheral portions of the shaft housings 12; however, the present invention is not limited to this example. For example, when an electric motor with a built-in brake is applied, it may be possible to configure a drive unit 1' as in a second embodiment illustrated in FIG. 9. Specifically, the second embodiment is different from the first embodiment in that only the base end portions of the support members 41 and 42 are rotatably engaged with the outer peripheral portions of the shaft housings 12, but the following configurations are the same as those of the first embodiment. That is, the end portions of the support members 41 and 42 are fixed to the vehicle body frame BF by the frame attachment bolts 141 and 142, the link portion 43 disposed on the gear housing 11 is fixed to the vehicle body frame BF by the linking bolt 143, and the position where the link portion 43 is disposed is located on the outer peripheral side of the tip end face of the support member 41 while the position where the linking bolt 143 is screwed in the link portion 43 is located on the outer peripheral side of the position where the frame attachment bolt 141 is screwed in the support member 41 based on the assumption that the shaft centers of the drive shafts 18 are a center. In the second embodiment, the same components as those of the first embodiment are denoted by the same reference symbols as those of the first embodiment, and the same explanation will not be repeated.

According to an electric forklift including the drive unit 1' configured as above, the link portion 43 is disposed at a position separate from the shaft centers of the drive shafts 18 in the gear housing 11, and the gear housing 11 is linked to the vehicle body frame BF via the link portion 43. Therefore, the link portion 43 can receive rotational reaction force that occurs when the front wheels FW are accelerated or decelerated due to drive of an electric motor 220. In this case, the position where the link portion 43 is provided is not limited by the support member 41, and may be set to an outer peripheral position of the support member 41 with respect to the shaft centers of the drive shafts 18. Consequently, it becomes possible to receive large rotational reaction force without ensuring a large rigidity of the link portion 43. As a result, it is possible to reduce the weight of the unit case 10.

Besides, external force applied from the ground via the front wheels FW is transmitted to the vehicle body frame BF via the shaft housings 12 and the support members 41 and 42, so that it becomes possible to prevent the external force from being applied to the gear housing 11 of the unit case 10. Therefore, even when the gear housing 11 is made thinner, it becomes possible to prevent the gear housing 11 from being deformed due to the external force applied from the ground. As a result, it becomes possible to reduce the weight of the drive unit 1' while preventing various failures due to deformation of the gear housing 11. Specifically, it becomes possible to prevent the deformation even when the gear housing 11 is made thinner, so that the drive shafts 18 and the idle shaft 34 can rotate while being maintained parallel to each other. As a result, it becomes possible to prevent abnormal noise, defect, or abnormal abrasion due to abnormal contact of the gear.

In the first and the second embodiments described above, the link portion 43 is disposed on the gear housing 11; however, the link portion 43 is not necessarily disposed on the gear housing 11. For example, even when a color member for separation is interposed between the vehicle body frame BF and the gear housing 11, and the vehicle body frame BF and the gear housing 11 are linked to each other via the color member, it becomes possible to obtain the same advantageous effects.

When the shaft housings 12 of the unit case 10 are welded with a plurality of casting components, and if the outer diameters of portions to be engaged with the engaging holes 41a and 42a of the support members 41 and 42 are made uniform, it becomes possible to make the plurality of casting components as common components, enabling to further reduce manufacturing costs.

REFERENCE SIGNS LIST 1, 1' drive unit
10 unit case
11 gear housing
12 shaft housing
14 hub
14a, 14b hub bearing
14c hub attachment nut
16 hub bolt
18 drive shaft
20 shaft attachment bolt
30 gear train
31 drive gear
32, 33 idle gear
34 idle shaft
41, 42 support member
41a, 42a engaging hole
41b, 42b joint connection portion
41bH bolt insertion hole
41c preventing portion
41d preventing surface
42 support member
43 link portion
50 brake unit
51 brake attachment bolt
120 electric motor
121 output shaft
130 differential gear
141, 142 frame attachment bolt
143 linking bolt
220 electric motor
BF vehicle body frame
FW forward wheel

The invention claimed is:
1. An electric forklift comprising:
a drive unit that includes a unit case, the unit case including
a gear housing that supports an electric motor with an output shaft oriented in a right and left direction and that houses a gear train; and
a pair of shaft housings which protrude in the right and left direction from the gear housing, respectively, each of the shaft housings rotatably housing a drive shaft, and each of the shaft housings rotatably supporting a wheel via a bearing, wherein
the drive shafts rotate via the gear train when the electric motor is driven;

a pair of support members, base end portions of which are rotatably engaged with outer peripheral portions of the shaft housings, respectively, and tip end portions of which are connected to a vehicle body frame so that the shaft housings in the right and left direction are supported by the vehicle body frame via the support members; and a link portion disposed between the gear housing and the vehicle body frame for preventing relative rotation of the unit case and the vehicle body frame about shaft centers of the drive shafts, wherein the link portion protrudes from the gear housing toward the vehicle body frame at an outer peripheral position of a support position where at least one of the support members is supported on the vehicle body frame while the shaft centers of the drive shafts are assumed as a center, and the link portion is linked to the vehicle body frame through a projection end face, the link portion is a separate member from the support members, and the link portion is formed as a protrusion extending from the gear housing toward the vehicle body frame.

2. The electric forklift according to claim 1, further comprising brake units, each of which is disposed between a hub linked to a corresponding one of the drive shafts and the outer peripheral portion of a corresponding one of the shaft housings, each of the brake units acting on the hub, and each of the brake units being supported on a base end portion of a corresponding one of the support members.

3. The electric forklift according to claim 1, wherein portions of the shaft housings to be engaged with engaging holes of the support members have a same diameter.

4. An electric forklift comprising:
a drive unit that includes a unite case, the unit case including
a gear housing that supports an electric motor with an output shaft oriented in a right and left direction and that houses a gear train; and
a pair of shaft housings which protrude in the right and left direction from the gear housing, respectively, each of the shaft housings rotatably housing a drive shaft, and each of the shaft housings rotatably supporting a wheel via a bearing, wherein the drive shafts rotate via the gear train when the electric motor is driven, a pair of support members, base end portions of which are rotatably engaged with outer peripheral portions of the shaft housings, respectively, and tip end portions of which are connected to a vehicle body frame so that the shaft housings in the right and left direction are supported by the vehicle body frame via the support members; and a link portion disposed between the gear housing and the vehicle body frame for preventing relative rotation of the unit case and the vehicle body frame about shaft centers of the drive shafts, wherein the link portion protrudes from the gear housing toward the vehicle body frame at an outer peripheral position of a support position where at least one of the support members is supported on the vehicle body frame while the shaft centers of the drive shafts are assumed as a center, and the link portion is linked to the vehicle body frame through a projection end face, further comprising a pair of preventing portions disposed on the support member, wherein the link portion is disposed between the preventing portions, and rotation of the support members with respect to the shaft housings is prevented by bringing the preventing portion into contact with the link portion.

5. The electric forklift according to claim 4, the preventing portions protrude from the tip end portion of the support member about the shaft centers of the drive shafts in an outer peripheral direction and preventing surfaces are provided on the preventing portions, respectively and the preventing portion comes into contact with the link portion via the preventing surface of the preventing portion.

* * * * *